(12) United States Patent
Canedo Pardo et al.

(10) Patent No.: US 11,092,140 B2
(45) Date of Patent: Aug. 17, 2021

(54) YAW SYSTEM FOR A WIND TURBINE

(71) Applicant: General Electric Renovables España, S.L., Barcelona (ES)

(72) Inventors: Santiago Canedo Pardo, Barcelona (ES); Jordi Mercadé, Barcelona (ES)

(73) Assignee: General Electric Renovables España, S.L., Barcelona (ES)

( * ) Notice: Subject to any disclaimer, the term of this patent is extended or adjusted under 35 U.S.C. 154(b) by 101 days.

(21) Appl. No.: 16/517,915

(22) Filed: Jul. 22, 2019

(65) Prior Publication Data

US 2020/0025179 A1   Jan. 23, 2020

(30) Foreign Application Priority Data

Jul. 20, 2018 (EP) .................................. 18382549

(51) Int. Cl.
| | |
|---|---|
| *F16H 37/06* | (2006.01) |
| *F03D 80/80* | (2016.01) |
| *F03D 13/20* | (2016.01) |
| *F16C 17/02* | (2006.01) |
| *F16D 55/225* | (2006.01) |
| *F16H 1/20* | (2006.01) |
| *F03D 7/02* | (2006.01) |

(52) U.S. Cl.
CPC ............ *F03D 80/88* (2016.05); *F03D 13/20* (2016.05); *F16C 17/02* (2013.01); *F16D 55/225* (2013.01); *F16H 1/206* (2013.01); *F03D 7/0204* (2013.01); *F05B 2240/913* (2013.01); *F05B 2260/503* (2013.01); *F16C 2360/31* (2013.01)

(58) Field of Classification Search
CPC ........ F03D 80/88; F03D 13/20; F03D 7/0204; F16C 17/02; F16C 2360/31; F16D 55/225; F16H 1/206; F05B 2240/913; F05B 2260/503
See application file for complete search history.

(56) References Cited

U.S. PATENT DOCUMENTS

| | | | |
|---|---|---|---|
| 8,371,030 B2 * | 2/2013 | Shiraishi | F03D 80/50 29/889.1 |
| 2005/0196280 A1 | 9/2005 | Gonzalez et al. | |
| 2009/0232652 A1 * | 9/2009 | Keller | F03D 7/0224 416/1 |

(Continued)

FOREIGN PATENT DOCUMENTS

| | | |
|---|---|---|
| DE | 10 2005 001344 A1 | 7/2006 |
| DE | 10 2011 010830 A1 | 8/2012 |
| EP | 2 837 818 A1 | 2/2015 |

OTHER PUBLICATIONS

EP Search Report, dated Jan. 24, 2019.

*Primary Examiner* — Jake Cook
(74) *Attorney, Agent, or Firm* — Dority & Manning, P.A.

(57) ABSTRACT

In a first aspect, a yaw system for rotating a nacelle with respect to a tower is provided. The yaw system comprises a gliding yaw bearing, an annular gear and a plurality of yaw drives, a braking disk and one or more braking disk for braking the rotation of the nacelle. In a further aspect, a tower adapter for a wind turbine is provided. The tower adapter comprises a first bearing component of a gliding yaw bearing and braking disk to brake the rotation of the nacelle with respect to the tower adapter. In yet a further aspect, a wind turbine comprising such a yaw system and/or such a tower adapter is provided.

15 Claims, 4 Drawing Sheets

(56) References Cited

U.S. PATENT DOCUMENTS

| | | | | |
|---|---|---|---|---|
| 2011/0254281 | A1* | 10/2011 | Noda | F03D 13/20 |
| | | | | 290/55 |
| 2012/0009063 | A1* | 1/2012 | Noda | F03D 7/0204 |
| | | | | 416/9 |
| 2012/0055024 | A1* | 3/2012 | Kawano | F03D 80/50 |
| | | | | 29/898.01 |
| 2012/0224799 | A1* | 9/2012 | Wagner | F16C 17/10 |
| | | | | 384/308 |
| 2017/0159643 | A1* | 6/2017 | Kim | F03D 7/0204 |
| 2018/0372071 | A1* | 12/2018 | Muller | F03D 7/0224 |
| 2019/0136831 | A1* | 5/2019 | Abreu | F03D 7/0244 |

* cited by examiner

YAW SYSTEM FOR A WIND TURBINE

The present disclosure relates to yaw systems for wind turbines, tower adapters comprising a yaw braking disk and wind turbines comprising such yaw systems or tower adapters.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

Most wind turbines comprise a yaw system used for orienting the rotor of the wind turbine in the prevailing wind direction. Normally, when the rotor is aligned with the wind direction, the yaw system maintains the position by means of brakes (e.g. hydraulic brake calipers and/or electro-brakes of the yaw motors). When the rotor is misaligned from the wind direction the yaw system rotates the nacelle to reach an appropriate alignment with the wind.

The yaw system normally performs this rotation of the nacelle by means of a yaw drive that includes a plurality of (electric or hydraulic) motors with suitable gearboxes for driving gears (pinions) that mesh with an annular gear or gear ring attached to the nacelle or to the wind turbine tower. The nacelle can thus be rotated around the tower's longitudinal axis in or out of the wind direction. The rotatable connection between the wind turbine tower and the nacelle is called a yaw bearing. The yaw bearing can be of the roller or gliding type.

Roller yaw bearings may in general comprise balls or rolling elements arranged between an inner ring and an outer ring for reducing the friction between these rings. As the friction between the inner and the outer rings is very low, yaw systems having roller bearings may require the yaw motors and the braking systems to be constantly activated for maintaining a yaw direction. As a result, braking systems and yaw motors are commonly oversized. Further, roller bearings are relatively costly when compared to other bearings, especially large yaw roller bearings.

Large wind turbine generators are generally subjected to high loads which are transferred from the nacelle to the tower through the yaw bearings. Rollers are therefore also subjected to high loads. Some rollers or balls may be crushed and bearings may therefore have to be replaced. In addition, as loads may be both axial and radial, some loads may cause a separation of the inner and outer rings of the yaw roller bearing. Accordingly, roller yaw bearings for large wind turbines may have to be reinforced which may also increase the cost of these yaw bearings.

Gliding yaw bearings or sliding yaw bearings may be used in large wind turbines because they are cheaper than roller yaw bearings and are able to withstand high loads in axial and radial directions. Gliding or sliding yaw bearings may include an annular gear or gear ring configured to be fixed to the tower wherein the frame of the nacelle may rest and slide in its yawing movement. Lubrication, e.g. oil or grease, may be applied between the annular gear and the frame of the nacelle for allowing the frame to rotate with respect to the annular gear. Lubrication reduces the friction between the annular gear and the frame of the nacelle and avoids the wear of the annular gear and/or the frame. Lack of lubrication may lead to a generation of noise. In addition, a sliding or gliding surface may be provided between the annular gear and the frame to avoid a direct contact between them. Gliding yaw bearings normally cannot be activated or deactivated so the frictional force provided is basically constant.

Despite this, the gliding surface may still provide a frictional force to maintain the nacelle in a desired yaw direction. Motors of the yaw system may also help to block the nacelle in a yawing position. However, the motors may need to be constantly working which may cause wearing of the gear teeth, involving costly repairs. Braking systems may accordingly be necessary. Braking systems may comprise two movable braking pads, e.g. brake calipers, that exert a pressure on the annular gear to avoid the rotation of the nacelle with respect to the tower (or at least to increase the frictional force). These brake systems can be activated and deactivated by the wind turbine control system e.g. a SCADA.

However, the lubrication between the annular gear and the frame of the nacelle may cause a negative effect on the braking systems because the lubrication may also contaminate the area of the annular gear clamped by the braking pads. Braking systems typically require a dry and a clean surface to provide high frictional force to retain the nacelle in a yawing position. As result, the braking force applied by the braking pads against the annular gear may be reduced. In addition, as lubrication may be applied during preventive maintenance operations or when excessive noises or vibrations are detected, the friction provided by the braking pads against the annular gear may therefore not be constant over the time. The friction force provided by the braking pads may not be sufficient for making the nacelle maintain a yawing direction. The efficiency of the braking system is therefore reduced. If the friction provided by the braking pads decreases it may cause damages in the yaw motors, e.g. a failure in the gearbox, and in the worst case it may wear down the annular gear.

The present disclosure provides examples of systems and methods that at least partially resolve some of the aforementioned disadvantages.

SUMMARY

In one aspect, a yaw system for rotating a nacelle with respect to a tower around a rotational axis in a wind turbine is provided. The yaw system comprises a gliding yaw bearing comprising a first bearing component configured to be coupled to a tower, a second bearing component configured to be coupled to a nacelle and a gliding assembly arranged between the first and the second bearing components, wherein the first bearing component is configured to rotate with respect to the second bearing component. The yaw system also comprises an annular gear and a plurality of yaw drives with a motor and a pinion for meshing with the annular gear for rotating the first bearing system with respect to the second bearing system. In addition, the yaw system comprises a braking disk and one or more braking units configured to exert a braking force on the braking disk for braking the rotation of the first bearing component with respect to the second bearing component.

In this aspect, a braking disc separate from the first and second bearing components is provided. The yaw system thus separates the gliding yaw bearing and the yaw brake systems. Contamination of the braking disk is thus reduced or avoided. The braking force provided by the braking units on the braking disk may therefore be unaffected by the lubrication applied on the first and the second bearing components. The braking capacity is therefore increased.

Furthermore, this yaw system allows using simpler and cheaper braking systems, e.g. braking calipers, when compared to yaw systems wherein the braking force is directly applied on the first or on the second bearing components. Manufacturing costs may therefore be reduced.

In another aspect, a tower adapter for a wind turbine extending along a vertical axis and configured to be fixedly coupled to a top portion of a wind turbine tower and to be rotatably coupled to a wind turbine nacelle is provided. The tower adapter comprises a first bearing component of a gliding yaw bearing configured to rotate with respect to a second bearing component of the gliding yaw bearing and a braking disk for receiving a braking force of one or more braking units for braking the rotation of the first bearing component with respect to the second bearing component.

According to this aspect, the braking disk may be integrated in the tower adapter. The yaw system may thus be more easily assembled.

In yet another aspect, a wind turbine comprising a nacelle, a tower and a yaw system for rotating the nacelle with the respect to the tower around a rotational axis is provide. The yaw system comprises a gliding yaw bearing comprising a first bearing component coupled to the tower, a second bearing component coupled to the nacelle and a gliding assembly arranged between the first and the second bearing components, wherein the first bearing component is configured to rotate with respect to the second bearing component. The yaw system further comprises an annular gear and a plurality of yaw drives with a motor and a pinion for meshing with the annular gear for rotating the first bearing system with respect to the second bearing system. In addition, the yaw system comprises a braking disk and one or more braking units configured to exert a braking force on the braking disk for braking the rotation of the first bearing component with respect to the second bearing component.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
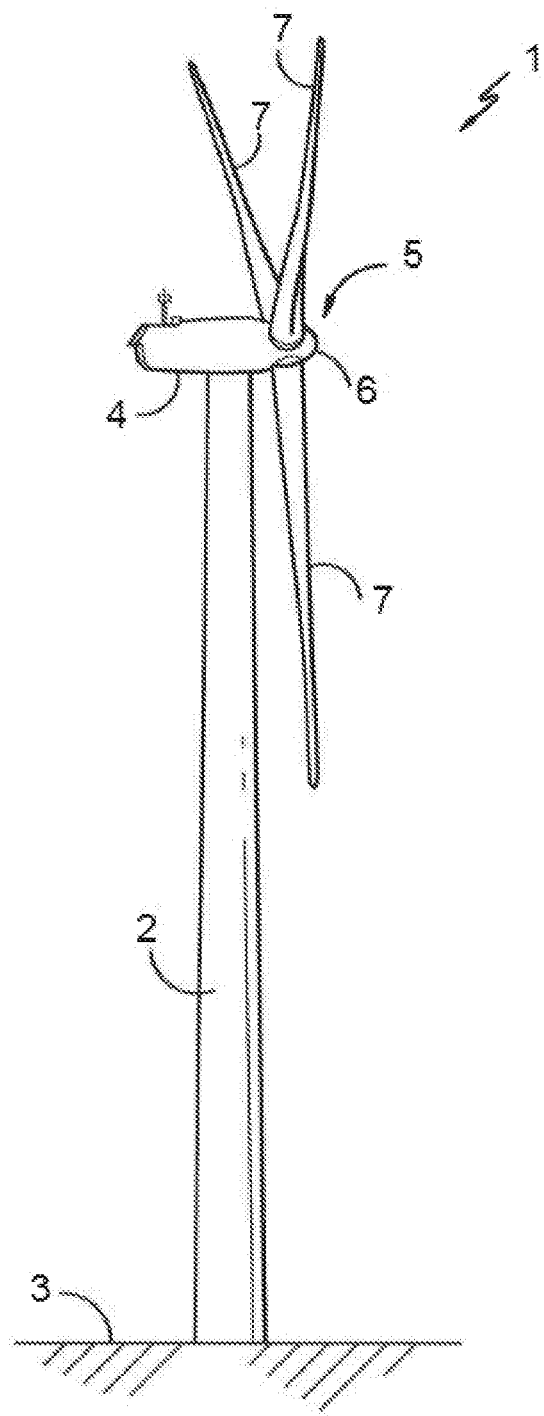
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced.

Figure 2:
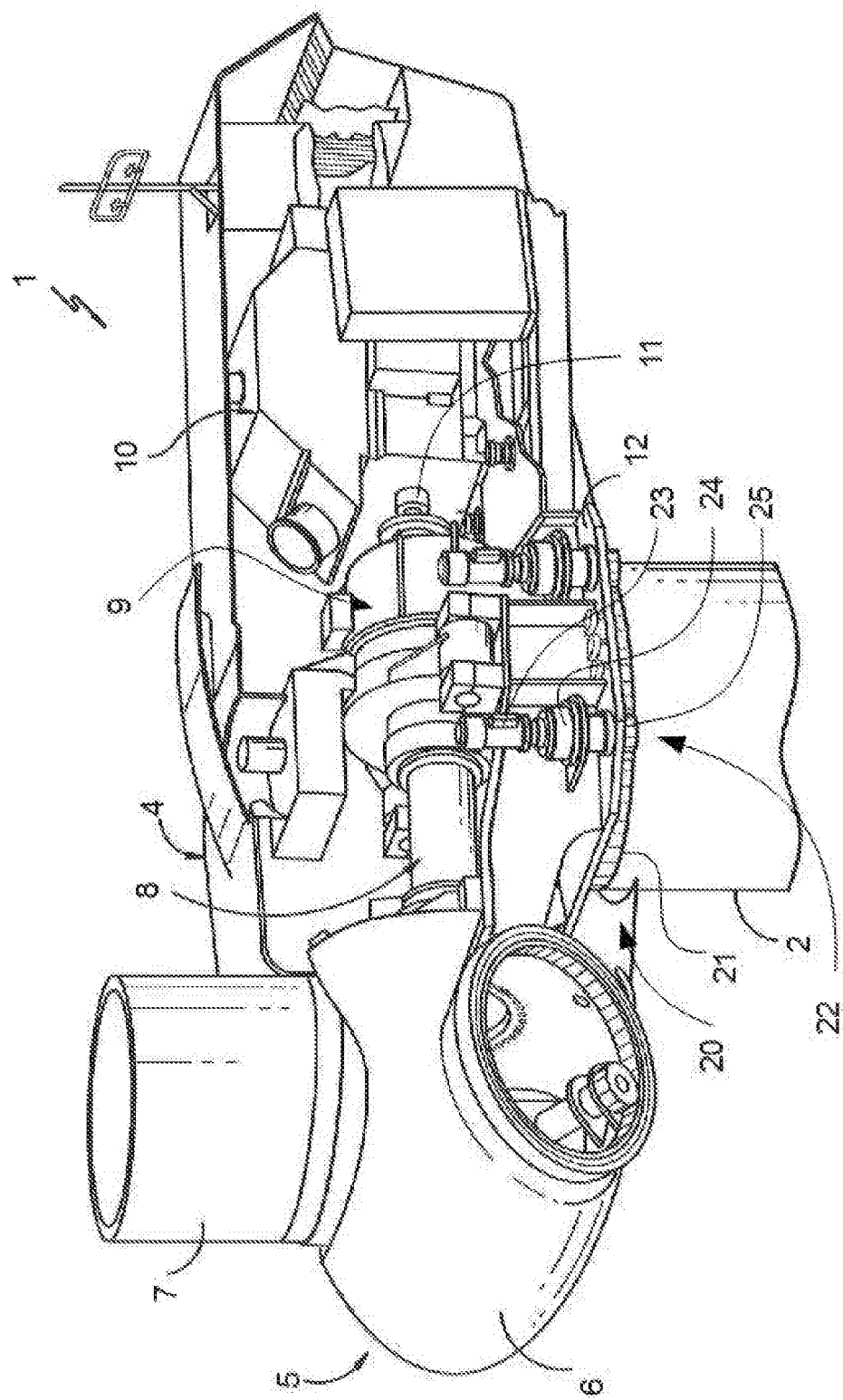
FIG. 2 illustrates a simplified, internal view of a nacelle of a wind turbine according to one example.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 5 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor 23, a gearbox 24 and a pinion 25 for meshing with the annular gear for rotating one of the bearing components with respect to the other.

Figure 3:
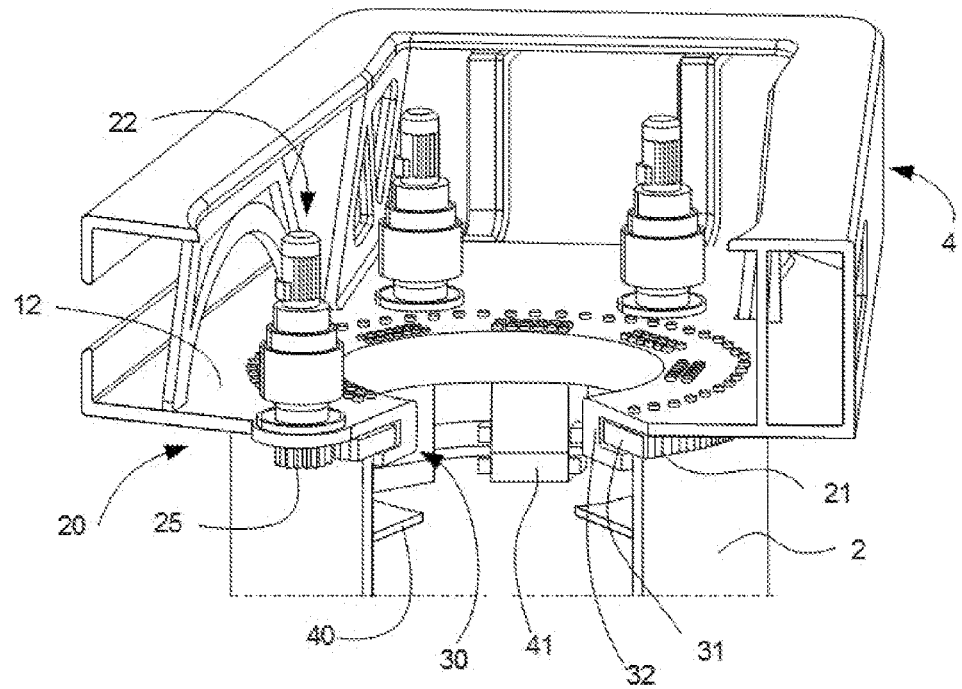
FIG. 3 illustrates an isometric view of a yaw system according to one example.

FIG. 3 illustrates an isometric view of a yaw system according to one example. The yaw system 20 comprises a gliding yaw bearing 30 having a first bearing component 31 coupled to the tower 2 and a second bearing component 32 coupled to or forming part of the support frame 12 of the nacelle 4, i.e. comprising a portion of the support frame 12. In this figure the first bearing component 31 is a gliding plate or gliding track or a gliding disk and the second bearing component 32 is a bearing guide or a guiding pad assembly. In this figure, the guiding pad assembly or bearing guide may comprise a portion of the support frame 12 and the gliding track or gliding plate may comprise a portion of a tower 2 or may be coupled to the tower. In other examples, the gliding plate may comprise a portion of a tower adapter, the tower adapter extending along a vertical axis and configured to be fixedly coupled to a top portion of a wind turbine tower. Between these two bearing components a gliding assembly (not visible in FIG. 3) may be arranged to reduce the friction between them.

The yaw system may comprise an annular gear 21 coupled to the tower 2 and a plurality of yaw drives 22 coupled to the support frame 12. The yaw drives 22 comprise a motor and a pinion 25 for meshing with the annular gear 21. The rotation of the pinon may rotate the pinion with respect to annular gear 21. In this example, the annular gear 21 is coupled to the first bearing component 31. The first bearing component 31 may therefore rotate with respect to the second bearing component 32.

The annular gear 21 may comprise a plurality of teeth which engage with the teeth of the pinion 25. In this example, the yaw drives 22 and the annular gear 21 are placed outside the external diameter of the tower. The teeth of the annular gear are outwardly orientated. In some examples, the annular gear 21 may be connected, e.g. welded or fastened, to the bearing or gliding plate. The annular gear 21 and the gliding plate may form an integral part.

In FIG. 3, the gliding plate may slide with respect to the guiding pad assembly which may partially enclose the gliding plate. The guiding pad assembly may comprise a top and a bottom axial gliding surface and a radial gliding surface. Such surfaces may define a C-shape. The gliding plate may be arranged between these gliding surfaces. The guiding pad assembly may thus guide the rotation of the gliding plate.

In these examples, the guiding pad assembly is placed in a radially inner side and the gliding plate in a radially outer side of the gliding yaw bearing. The gliding plate or gliding track may therefore extend radially inwardly towards the rotational axis of the nacelle, whereas the guiding pad assembly may extend radially outwardly from the rotational axis of the nacelle. However, in other examples, the gliding plate may be placed in a radially inner side and the guiding pad assembly in a radially outer side.

The yaw system of FIG. 3 further comprises a braking disk 40 and one or more braking units 41 configured to exert a braking force on the braking disk 40 for braking or blocking the rotation of the first bearing component 31, e.g. a gliding plate, with respect to the second bearing component 32, e.g. a guiding pad assembly. The braking disk 40 may be coupled to the first bearing component 31. In FIG. 3, the braking disk and the guiding plate are connected to the tower, e.g. welded or through fasteners. In other examples, the braking disk and/or the gliding plate may be integrally formed with a tower section or with a tower adapter configured to be connected to the top portion of a wind turbine tower. They may be made in a single piece, e.g. by casting. In some examples, the braking disk may extend 360° around the rotational axis. Alternatively, the braking disk may extend less than 360°, e.g. 90°-270°, around the rotational axis.

The braking units 41 or brake calipers may be attached to the support frame 12 and may engage with the braking disk 40 to block rotation of the nacelle with respect to the tower. The braking units 41 may comprise a pair of braking pads movable relative towards each other for clamping the braking disk. The braking pads may therefore provide the braking force for braking the rotation of the nacelle or for maintaining a yawing orientation.

Braking units may be passive or active. In some examples, some braking units may be passive and other active.

Passive braking units may comprise a spring for passively moving the braking pads towards each other. The spring may be connected to one of the braking pad which may provide a frictional force against the braking disk.

Active braking units may comprise a driving system for moving the braking pads towards each other. The driving system may control the force exerted by the braking pads on the braking disk. The driving system may be a piston attached to one of the braking pads. Alternatively, the driving system may include a pair of pistons, each of them attached to one of the braking pads. The driving system may hydraulic or electromechanical. In some examples, the activation and deactivation of the active braking units may be controlled by a wind turbine control.

Figure 4:
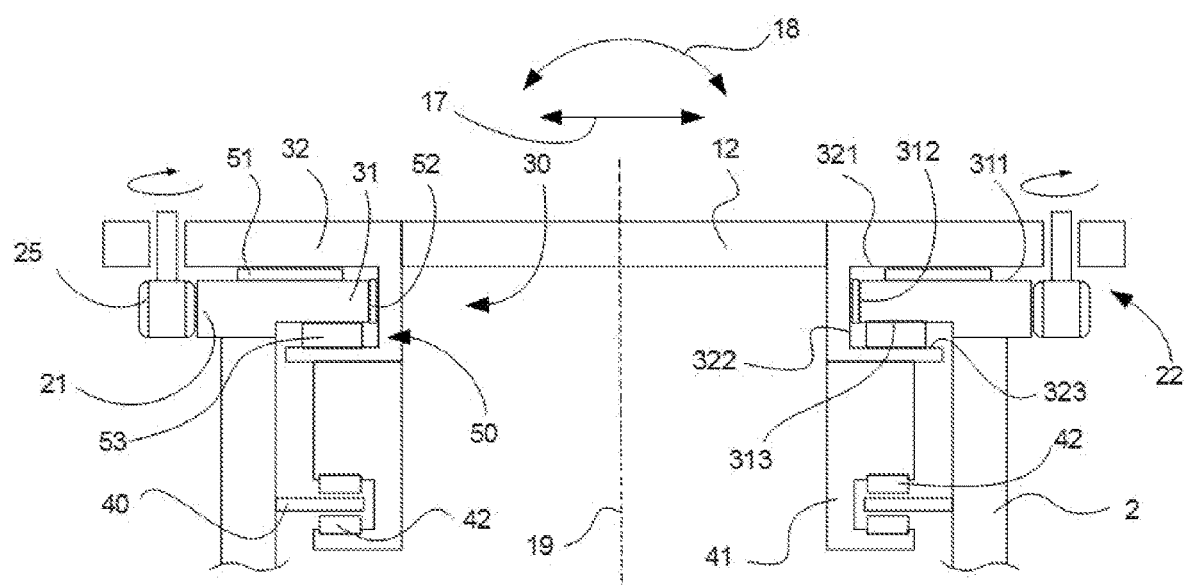
FIG. 4 schematically illustrates a yaw system according to one example.

FIG. 4 schematically illustrates a yaw system 20 with external yaw drives 22 with a pinion 25 that engages an annular gear 21 coupled to the tower 2. The first bearing component 31 is a guiding plate or guiding track connected to the annular gear 21 and to the tower 2. In some examples, the gliding plate may be integrally formed with at least one of the annular gear 21 or the tower 2 or tower adapter connected to a top portion of a tower. The gliding plate or track may thus comprise a portion of the tower or of the tower adapter. In some examples, the gliding plate may be formed by several parts or elements.

In FIG. 4, the second bearing component 32 is a bearing guide or guiding caliper or guiding pad assembly connected to the support frame 12 which may rotate with respect to the first bearing component 31 around a rotational axis 19 by the action of the pinion 25 or other driving mechanisms. The guiding pad assembly may be formed by an integral piece or may be formed by joining several parts. In some examples, the guiding pad assembly may comprise a portion of the support frame. A pair of braking units 41 having movable braking pads 42 may be connected to the second bearing component 32. The braking pads 42 may clamp the braking disk 40 coupled to the tower 2 for blocking yawing movement of the nacelle.

A gliding assembly 50 may be arranged between the first bearing component 31 and the second bearing component 32.

The first bearing component 31 may include a top axial gliding surface 311, a bottom axial gliding surface 313 and a radial gliding surface 312, The second bearing component 32 may partially enclose the second bearing component. The second bearing component 32 may also include a top axial gliding surface 321, a bottom axial gliding surface 323 and a radial gliding surface 322. The top axial gliding surface 311 of the first bearing component 31 may face the top axial gliding surface 321 of the second bearing component 32. Similarly, the bottom axial gliding surfaces and the radial gliding surfaces may respectively face to each other.

According to these aspects, the bearing components may have three gliding surfaces. These gliding surfaces may limit undesirable movements of the second bearing components with respect to the first bearing component. Loads may therefore be more efficiently transmitted to the tower.

Variable loads of the wind acting on wind turbine blades may be transmitted through the support frame 12 to the tower. These loads acting on the blades may produce a tower fore aft movement 18, which tries to modify the tilt of the nacelle. This may create an up and down movement of opposite parts of the nacelle. In FIG. 4, the top 311 and the bottom axial gliding surface 313 of the first bearing component 31 limits such an up and down movement of the nacelle 4 by limiting the movement of the second bearing component 32 with respect to the first bearing component 31.

Loads on the blades may also produce a thrust force 17 trying to produce a backward and a forward movement of the nacelle. In FIG. 4, the radial gliding surface 312 of the first bearing component 31 may limit the backward and forward movement of the nacelle by blocking the horizontal movement of the second bearing component 32.

In some examples, the gliding assembly 50 arranged between the bearing components may comprise a plurality of gliding pads. In some of these examples, the gliding assembly 50 may comprise one or more top axial gliding pads 51 arranged between the top axial gliding surfaces 311, 321 of the first and the second bearing components, one or more bottom axial gliding pads 53 arranged between the bottom axial gliding surfaces 313, 323 of the first and the second bearing components; and one or more radial gliding pads 52 arranged between the radial gliding surfaces 312, 313 of the first and the second bearing components. Accordingly, the friction between the gliding surfaces of the bearing components may be controlled. In some examples, the gliding pads may include grease or lubrication in order to reduce the friction coefficient and reduce or control noise. Vibrations of the nacelle may also be absorbed by the gliding pads of the gliding assembly 50.

In some examples, one or more of the gliding pads may comprise a pressure system for controlling the pressure provided by the gliding pads to the gliding surfaces. The friction between the adjacent gliding surfaces may thus be controlled. The pressure system may comprise a spring or a bolt that adjust the pressure between the two bearing components. In other examples, the pressure system may comprise pneumatic or hydraulic pre-tension elements.

Figure 5:
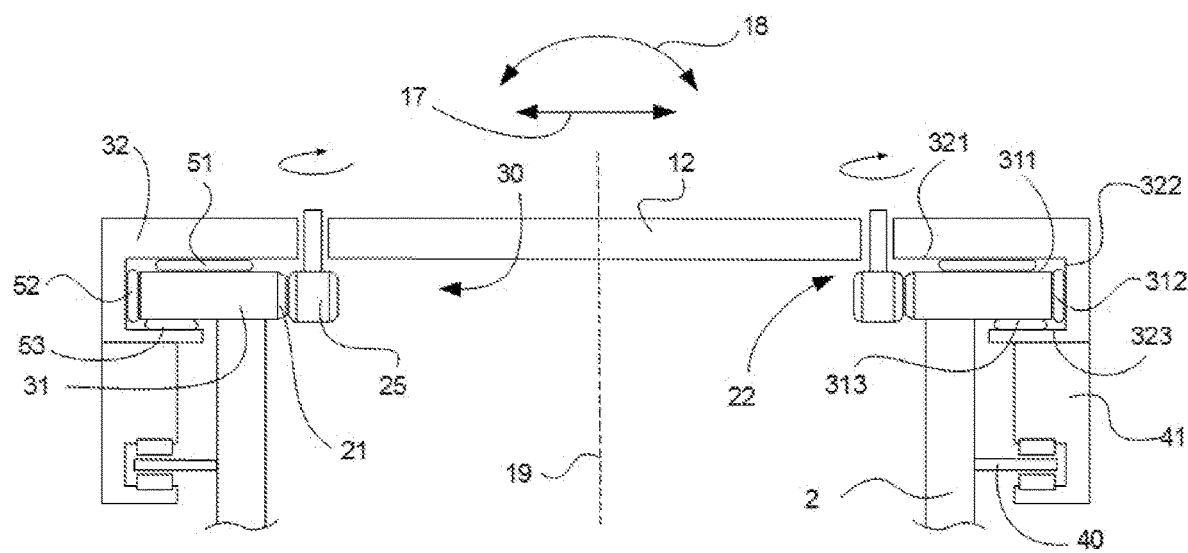
FIG. 5 schematically illustrates a yaw system according to one example.

FIG. 5 schematically illustrates an example of a yaw system 20 wherein the yaw drives 22 are arranged in the inner side of the gliding yaw bearing, i.e. inside the diameter defined by the tower. The annular gear 21 may be coupled to the tower 2 and the teeth may therefore be inwardly oriented for meshing the pinion 25 of the yaw drives 22. The braking module 41 may be coupled to the second bearing component 32 and may engage with braking disk 40 coupled to the tower 2.

In these examples, the first bearing component 31, e.g. a gliding plate, is placed in a radially inner side and the second bearing component 32, a guiding pad assembly, in a radially outer side of the gliding yaw bearing. The aperture of the guiding pad assembly may face inside the tower.

Similar to the examples described with respect to FIG. 4, in FIG. 5 the first bearing component 31 and the second bearing component 32 may comprise top axial gliding surface 311 and 321, bottom axial gliding surfaces 313 and 323 and radial axial gliding surfaces 312 and 322. These gliding surfaces may allow minimizing undesired movements or vibrations of the nacelle with respect to the tower, in particular tower fore-aft movements 18 or those produced by the thrust force 17. A gliding assembly 20 including a top axial gliding pad 51, a radial gliding pad 52 and a bottom gliding pad 53 may be arranged between the adjacent gliding surfaces.

In some other examples, the yaw drives 22 may be coupled to the tower (directly or through an intermediate piece) and the annular gear 21 to the frame 12. The yaw drives may be arranged inside or outside the tower. In some of these examples, the first bearing component may be a guiding pad assembly and the second bearing component may be a gliding plate. The first bearing component and the second bearing may alternatively be placed in an inner side or in an outer side of the gliding yaw system.

Figure 6:
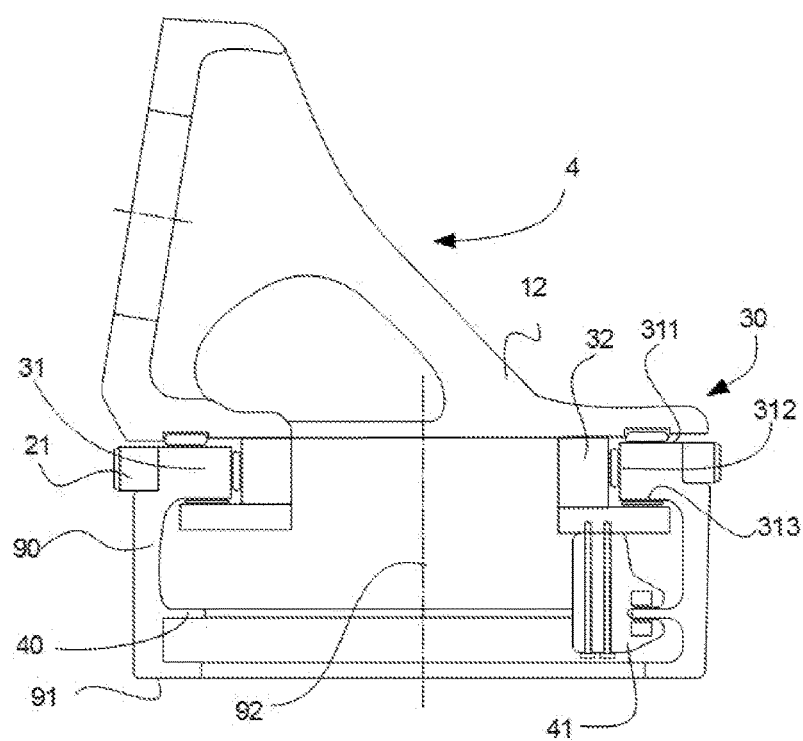
FIG. 6 schematically illustrates a tower adapter according to one example.

FIG. 6 schematically illustrates a tower adapter 90 according to one example. The tower adapter 90 extends along a vertical axis 92 and is configured to be fixedly coupled to a top portion of wind turbine tower (not illustrated in FIG. 6) and to be rotatably coupled to a wind turbine nacelle 4.

The tower adapter 90 comprises a first bearing component 31 that may engage with a second bearing component 32 associated with the nacelle 4 to form a gliding yaw bearing 30. In FIG. 6, the second bearing component 32 may be coupled to the support frame 12.

The tower adapter may further comprise a braking disk 40 for receiving a braking force from one or more braking units 41 coupled to the support frame 12. The braking disk 40 and the braking units 41 may be according to any of the examples herein described. For instance, the braking disk 40 may extend 360° around the vertical axis. Alternatively, the braking disk may extend less than 360° around the vertical axis.

The braking disk 40 may be arranged apart from the first bearing component 31. The braking disk 40 may be arranged on the bottom portion of the tower adapter and the first bearing component 31 on the top portion. Contamination of the braking disk 40 from the oil or grease of the gliding yaw bearing 30 may thus be reduced.

The tower adapter 90 may comprise a flange 91 for connecting, e.g. bolting, to the top portion of the tower. A fixed connection between the tower adapter 90 and the tower may thus be established. In some examples, the flange 91 may comprise the braking disk 40.

In some examples, the first bearing component 31 may comprise a top axial gliding surface 311, a bottom axial gliding surface 313 and a radial gliding surface 312. These gliding surfaces may engage with the corresponding gliding surfaces of a second bearing component 32. In some of these examples, the first bearing component may be a bearing plate or a gliding plate or a gliding disk. The gliding plate may extend inwardly towards the vertical axis 92, i.e. from the wall of the tower adapter towards the vertical axis 92.

In some examples, the second bearing component 32, e.g. the guiding pad assembly, may be integrally formed with the support frame 12. Alternatively, the second bearing component may be formed from several pieces joined, e.g. welded or bolted, to the support frame 12.

The gliding yaw bearing 30 that may be formed with the first bearing component 31 of the tower adapter 90 and the second bearing component 32 coupled to the nacelle may be according to any of the examples herein described.

In some examples, the tower adapter 90 may comprise an annular gear 21 for meshing with the pinions of yaw drives mounted on the nacelle. Meshing the pinion with annular gear makes the nacelle rotate with respect to the tower adapter. Alternatively, the tower adapter may comprise one or more yaw drive supports for supporting the yaw drives. The yaw drive may therefore mesh with an annular gear mounted on the nacelle.

In some examples, a tower adapter according to any of the examples herein disclosed may be used in a method for refurbishing or reconditioning a wind turbine. Refurbishing or reconditioning a wind turbine allows using a more efficient technology and components on existing base components, e.g. a foundation and/or a tower. For example, a new more technologically advanced machine head and a yaw drive can be provided onto an existing tower or onto a portion of an existing tower. Accordingly, additional life and more efficient power generation can be provided with reduced capital expenses. For this reason, refurbishing a wind turbine may also be called repowering.

A tower adaptor according to any of the examples herein disclosed may be used to connect a machine head, i.e. a rotor and a nacelle including a generator, to a wind turbine tower portion or to an existing wind turbine tower. The diameters of a top flange of the existing tower and a new yaw bearing may generally be different. A tower adapter may be used to transition from the diameter of the top flange of the tower to the diameter of the yaw bearing. The tower adapter may thus allow coupling a new yaw bearing to a top flange of a tower. According to this aspect, the tower adapter may comprise a flange for connecting, e.g. bolting, to the top flange of the tower. A fixed connection between the tower adapter and the tower may thus be established. A new machine head may thus be coupled to an existing tower or tower portion. One side of the tower adapter may thus have a flange with (inner and outer) diameters corresponding to a top flange of the tower, whereas the upper side of the tower adapter incorporates the first bearing component of suitable diameter to form the yaw mechanism.

In yet a further aspect, a wind turbine is provided. The wind turbine comprises a nacelle, a tower and a yaw system for rotating the nacelle with the respect to the tower around a rotational axis. In some examples, the wind turbine may comprise the yaw system according to any of the examples herein described.

Alternatively or additionally, the wind turbine may comprise a tower adapter connected to the top portion of the wind tower according to any of the examples herein described. The vertical axis of the tower adapter may correspond to the rotational axis of the nacelle with respect to the tower.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A yaw system for rotating a nacelle with respect to a tower around a rotational axis in a wind turbine, comprising:
    a gliding yaw bearing comprising a first bearing component configured to be coupled to a tower, a second bearing component configured to be coupled to a nacelle, and a gliding assembly arranged between the first and the second bearing components, wherein the first bearing component is rotatable relative to the second bearing component;
    an annular gear;
    a plurality of yaw drives, each yaw drive comprising a motor and a pinion that meshes with the annular gear to rotate the first bearing component relative to the second bearing component;
    a braking disk separate from the first bearing component and the second bearing component; and
    one or more braking units configured to exert a braking force on the braking disk for braking the rotation of the first bearing component relative to the second bearing component.

2. The yaw system according to claim 1, wherein each of the first and the second bearing components comprise a top axial gliding surface, a bottom axial gliding surface, and a radial gliding surface.

3. The yaw system according to claim 2, wherein the gliding assembly comprises:
    one or more top axial gliding pads arranged between the top axial gliding surfaces of the first and the second bearing components;
    one or more bottom axial gliding pads arranged between the bottom axial gliding surfaces of the first and the second bearing components; and
    one or more radial gliding pads arranged between the axial gliding surfaces of the first and the second bearing components.

4. The yaw system according to claim 1, wherein one of the first or second bearing components is a gliding plate and the other of the first or second bearing components is a guiding pad assembly partially enclosing the gliding plate.

5. The yaw system according to claim 4, wherein the guiding pad assembly is at a radially inner side and the gliding plate is at a radially outer side of the gliding yaw bearing.

6. The yaw system according to claim 5, wherein the guiding pad assembly comprises a portion of a support frame for the nacelle.

7. The yaw system according to claim 5, wherein the gliding plate comprises a portion of a tower adapter, the tower adapter extending along a vertical axis and configured to be fixedly coupled to a top portion of a wind turbine tower.

8. The yaw system according to claim 4, wherein the gliding plate is at a radially inner side and the guiding pad assembly is at a radially outer side of the gliding yaw bearing.

9. The yaw system according to claim 1, wherein the braking disk is coupled to the first bearing component.

10. The yaw system according to claim 1, wherein each of the braking units comprises a pair of braking pads movable towards each other for clamping the braking disk.

11. The yaw system according to claim 1, wherein at least one of the braking units is passive.

12. A wind turbine comprising yaw system according to claim 1.

13. A tower adapter configured to extend along a vertical axis for coupling to a top portion of a wind turbine tower and to be rotatably coupled to a wind turbine nacelle, the tower adapter comprising:
    a gliding yaw bearing comprising a first bearing component and a second bearing component, the first bearing component rotatable relative to the second bearing component; and
    a braking disk separate from the first bearing component and the second bearing component and disposed to receive a braking force from one or more braking units to brake the rotation of the first bearing component relative to the second bearing component.

14. The tower adapter according to claim 13, wherein the first bearing component and the braking disk are integrally formed with the tower adapter.

15. The tower adapter according to claim 13, further comprising a mounting flange to mount the tower adapter to a top portion of the wind turbine tower, the braking disc configured with the flange.

* * * * *